May 26, 1959 — J. FOSSA — 2,887,700
EXTRA SIDE SUPPORTS FOR THE TURRET STRUCTURE
Original Filed Dec. 19, 1952 — 5 Sheets-Sheet 1

Inventor
Joseph Fossa
By his Attorney
Maxwell Fish

May 26, 1959  J. FOSSA  2,887,700
EXTRA SIDE SUPPORTS FOR THE TURRET STRUCTURE
Original Filed Dec. 19, 1952  5 Sheets-Sheet 2

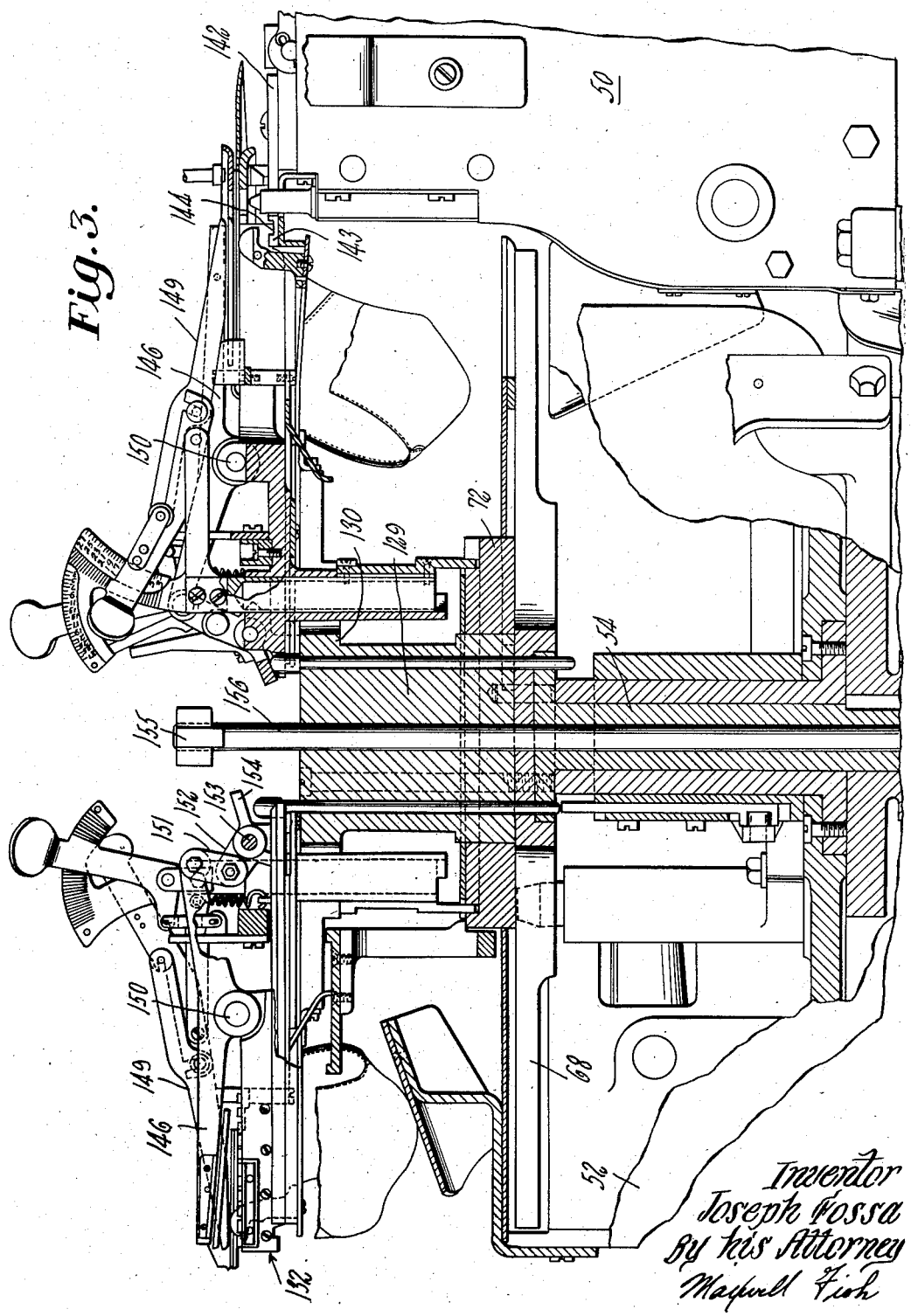

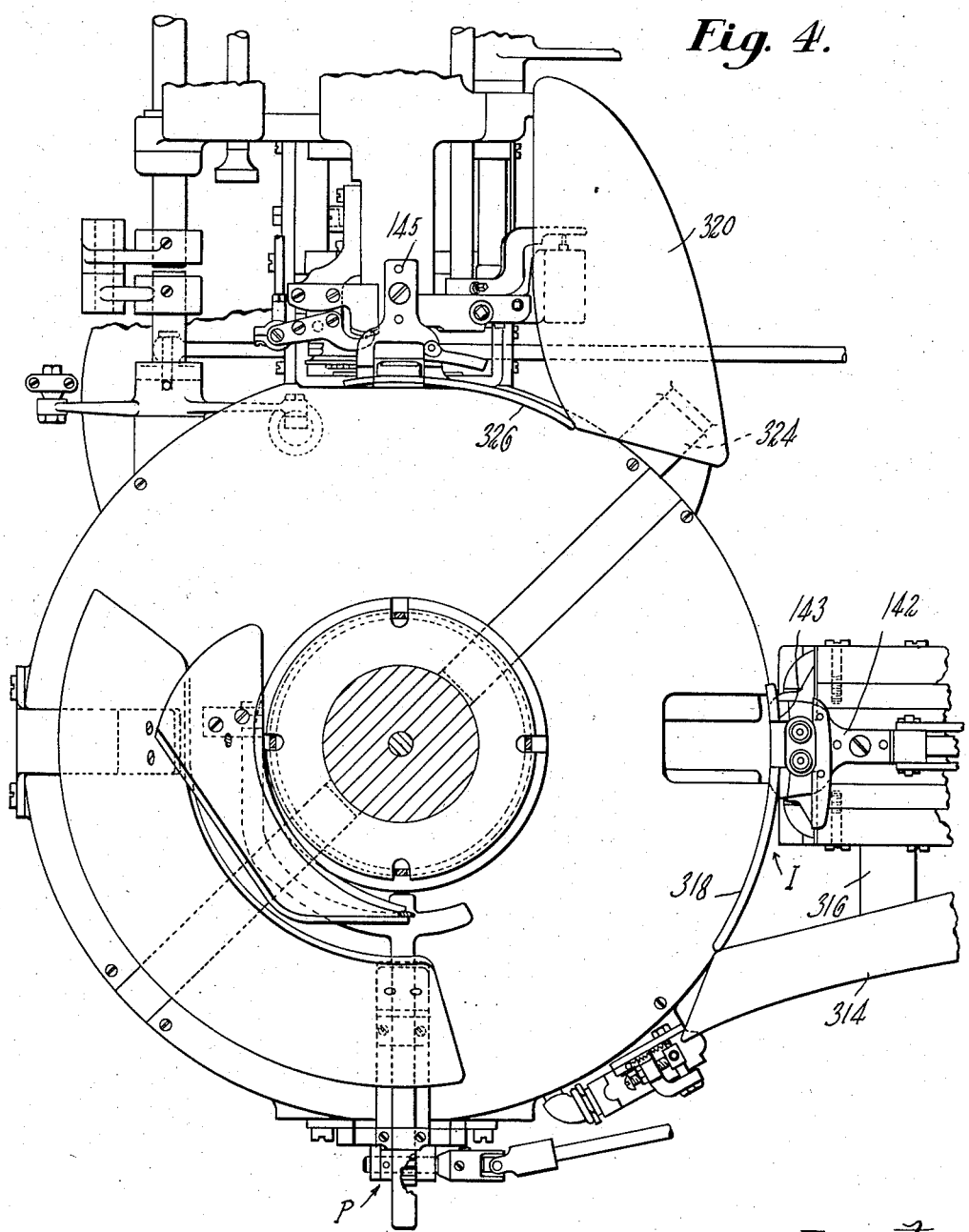

May 26, 1959  J. FOSSA  2,887,700
EXTRA SIDE SUPPORTS FOR THE TURRET STRUCTURE
Original Filed Dec. 19, 1952  5 Sheets-Sheet 5
Fig. 6.
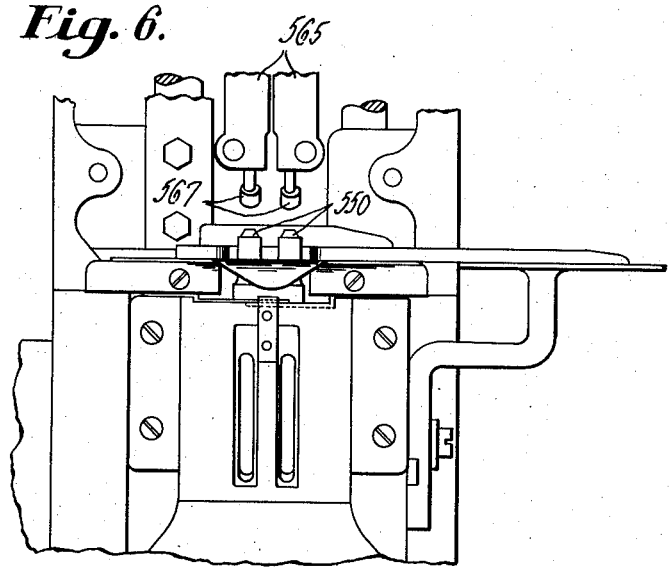
Fig. 7.
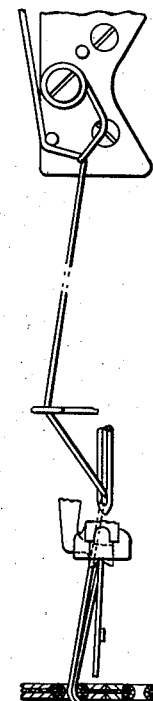
Fig. 5.
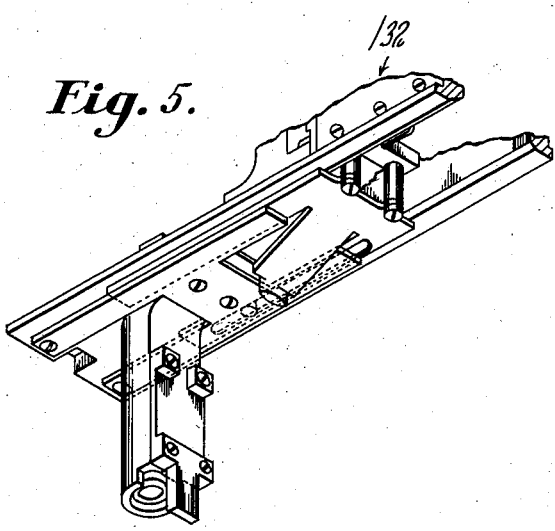
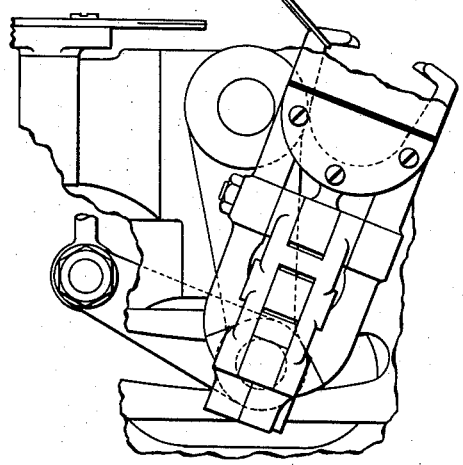
Inventor
Joseph Fossa
By his Attorney
Maxwell Fish United States Patent Office 2,887,700
Patented May 26, 1959

2,887,700

EXTRA SIDE SUPPORTS FOR THE TURRET STRUCTURE

Joseph Fossa, South Hamilton, Mass., assignor to United Shoe Machinery Corporation, Flemington, N.J., a corporation of New Jersey Original application December 19, 1952, Serial No. 326,948. Divided and this application May 26, 1958, Serial No. 737,573

3 Claims. (Cl. 12—58.5)

The present invention relates to improved devices for supporting outlying portions of a shoe upper supported with the lacing margins thereof in edge-facing relation on a workholder for movement with and relative to a turret for presentation to each of a plurality of loading and unloading and operating stations.

The invention is herein disclosed as embodied in a machine for automatically eyeleting and lacing the eyeleted upper which is in many respects similar to that shown in the patent to Fossa, No. 2,461,889, dated February 15, 1949, for Machine and Method for Manufacture of Shoes. The present application is a division of the co-pending application of Fossa Ser. No. 326,948 for Machine for Operating Upon Shoe Uppers filed in the United States Patent Office December 19, 1952. The machine referred to in general provides a rotatable work supporting turret on which are carried four radially movable workholders each provided with clamping devices for supporting the upper with the lacing margins thereof in an opened-out edge-facing relation and with the heel portion of the upper extending radially inwardly on the workholder toward the axis of the turret. Disposed about the turret are a loading station including means which enable the operator to locate and to secure the upper on the workholder in an exactly predetermined position in accordance with the size and style of the upper to be operated upon. By successive quarter turns of the turret the workholder and upper supported thereon are brought successively into operating relation with an eyeleting machine for inserting eyelets in successive pairs in the upper, and into operating relation with a lacing machine for lacing the eyeleted upper. A further quarter turn of the turret brings the workholder to an unloading station at which the eyeleted and laced upper is released from the workholder preparatory for removal from the machine.

It is an object of the invention to provide improved auxiliary supporting devices for outlying toe portions of the upper particularly during the transfer of the upper to each successive operating station, and during the feeding movements of the workholder outwardly at each of said operating stations for the performance of an operation on the shoe upper.

The several features of the invention will be readily understood by one skilled in the art from the following description taken in connection with the accompanying drawings in which:

Fig. 3 is a view in front elevation of the turret and workholder assembly partly sectioned on a section line passing through the turret axis two of the workholders disposed respectively at the eyeleting and unloading stations being shown;

Fig. 4 is a somewhat fragmentary plan view of the work supporting turret casing including the cover for the turret casing, the locating device, the feed slides at each of the eyeleting and lacing stations, and certain of the upper guiding and shielding surfaces provided in accordance with the invention;

Fig. 5 is an isometric view looking from below illustrating portions of one of the workholders, and the shoe upper locating slide with the locating pins and fin slidably mounted on the workholder.

Fig. 6 is a fragmentary view of the eyeleting machine looking radially outwardly from the turret in order to illustrate the shoe upper supporting and guiding devices associated with the eyeleting machine feed slide; and Fig. 7 is a view in front elevation illustrating particularly the looper mechanism, parts being shown in the position subsequent to the first position taken when the needle has completed its first advancing retracting movement.

Figure 1:
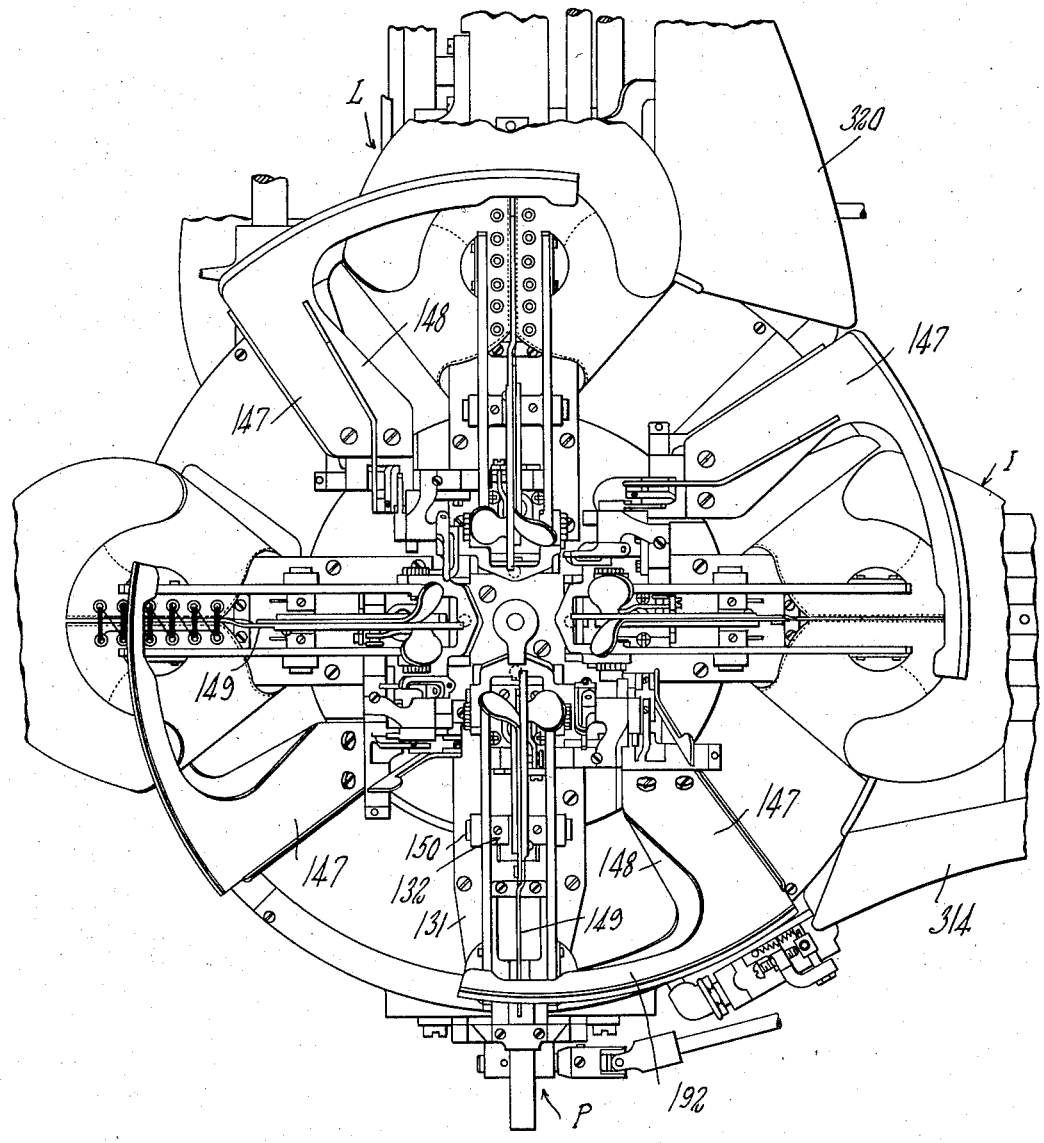
Fig. 1 is a fragmentary plan view of an automatic machine for eyeleting and for lacing the eyeleted shoe upper illustrating particularly the work supporting and transfer assembly of the machine including the turret and four workholders.
Figure 2:
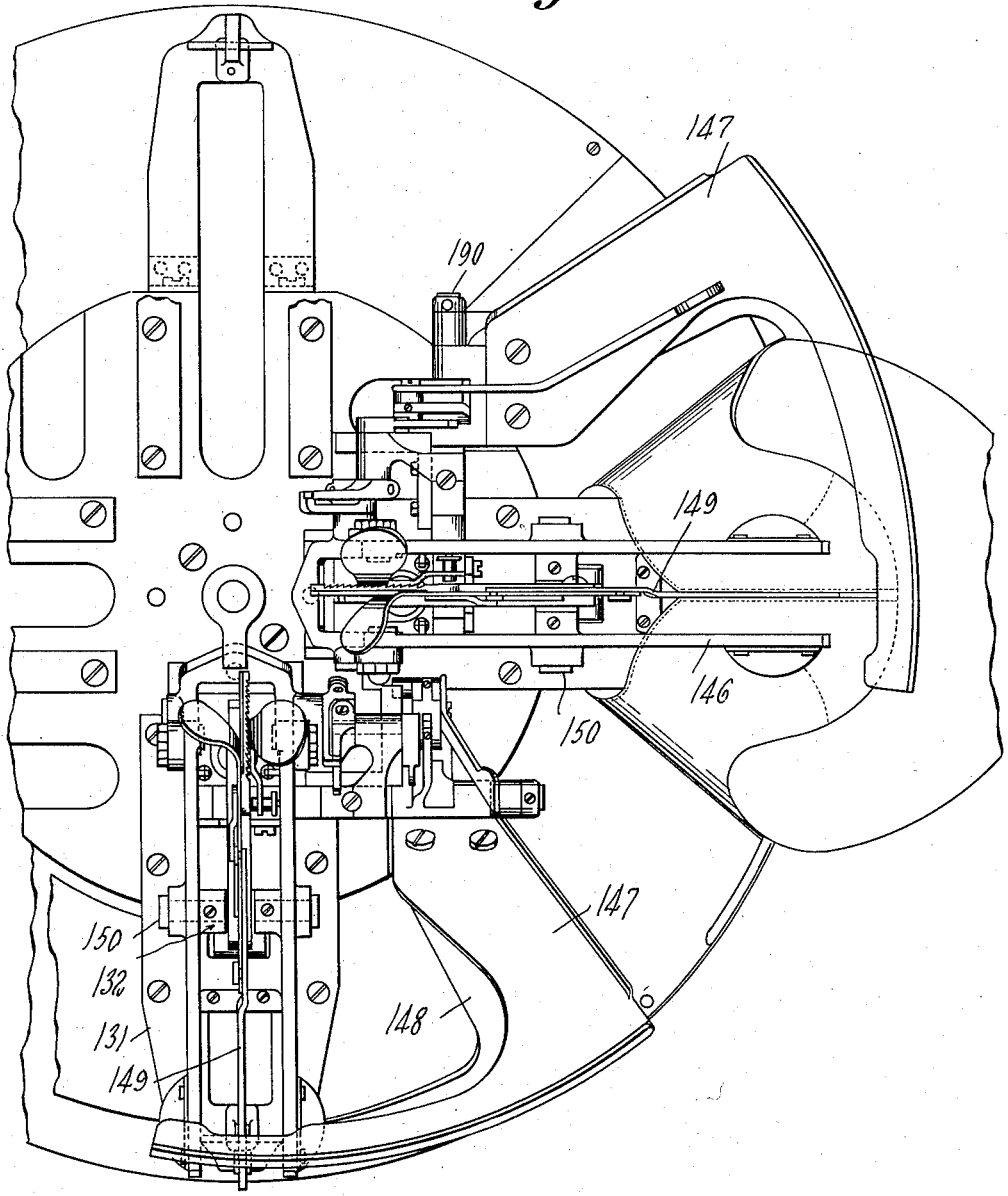
Fig. 2 is a fragmentary view on an enlarged scale of the turret mechanism shown in Fig. 1 illustrating one of the workholders with an upper clamped therein, a second workholder in its open position and a third workholder partially broken away to show underlying parts.

Referring to the drawings, the general arrangement of the improved machine disclosed for performing related eyeleting and lacing operations upon a shoe upper is generally indicated in the plan views. Figs. 1, 2 and 4 and in the partly sectioned side view, Fig. 2, only so much of the machine, however, being shown as is believed necessary to illustrate the connection of the present invention therewith. For a more detailed disclosure of the machine, reference may be had to the Fossa Patent No. 2,461,889, dated February 15, 1949 for Machine and Method for Manufacture of Shoes. In the present disclosure, the base of the machine is generally indicated at 50 (see Fig. 3) and includes a cylindrical casing 52 within which is mounted an indexing work supporting turret. The turret provides support for four workholders 132 which are mounted on guideways 131 extending radially outward from the turret at 90° angles from one another. At the front side of the machine, there is provided a locating station which comprises a locating mechanism generally indicated at P for the assistance of the operator in locating and clamping successive uppers on the workholders. At the remaining stations proceding in a counterclockwise direction around the turret there are provided an eyeleting mechanism generally indicated at I, a lacing mechanism generally indicated at L, and a fourth station between the lacing and loading station to which the workholding clamps are released.

With the present construction the turret 54 is provided with an upward extension or hub 129 which is rigidly secured to the turret shaft 54 and disc 68 and is formed with a table top 130 which is of substantially smaller diameter than the disc 68 previously referred to (see Figs. 2 and 3). At its lower end the hub 129 is externally supported by the sleeve bearing member 72. The table top provides support for four guideways 131 (see Fig. 2) which extend radially outwardly from the turret at 90° angles to one another to receive the respective workholders 132.

As in the Fossa patent referred to, the workholders are normally maintained in a fully retracted position on their guideways 131 toward the axis of the turret except that at each of the eyeleting and lacing stations the workholder is operatively connected with a feed slide which acts to impart a stepped feeding movement to the workholder and upper mounted thereon outwarlly into operating relation with the respective eyeleting and lacing mechanisms, and thereafter to return the workholder to the normally retracted position on the turret preparatory to a further indexing movement of the turret. The feed slide associated with the eyeleting machine is indicated at 142 (see Fig. 3) having a birfurcated outer end 143 notched for locking engagement with correspondingly formed notches 144 in the workholder. The feed slide associated with the lacing machine is indicated at 145 (see Fig. 4) similarly formed with a bifurcated and notched outer end portion for engagement with the workholders presented successively thereto by the indexing movement of the turret.

The eyeleting machine is of the so-called duplex type which comprises duplicate eyelet inserting units comprising identical punch and set mechanisms and duplicate eyelet feeding devices associated therewith. The two eyelet inserting units are constructed and arranged for the insertion of one pair of eyelets at a time, this operation being synchronized with relation to the feed mechanism which imparts a stepped advancing movement to the associated workholder and upper. Elements of the eyeleting mechanism (see Fig. 6) include a pair of hollow punches 550, and a pair of pendular bearing members 565 on which are mounted a pair of punch beds 567. A pair of eyelet inserting tools which cooperate therewith are not specifically shown. For a detailed description of the eyeleting mechanism reference may be had to the Fossa patent above referred to.

The lacing machine provided at station L is in general similar to the lacing machine specifically illustrated in the Fossa Patent No. 2,461,889 above referred to.

The lacing machine operates in accordace with a recurring cycle of operations to insert a group of four stitches in each of successive pairs of eyelets, this cycle being synchronized with relation to the feed mechanism which imparts a stepped advancing movement to the associated workholder and upper.

Each workholder 132 as shown, for example, in Fig. 3 has mounted thereon a pair of movable work clamping jaws 146, a pair of vamp spreaders 147, 148 (Figs. 1 and 2) and a lace measuring or slotting bar 149. The work clamping jaws comprise a pair of lever arms which are supported intermediate their length on a pivot shaft 150 on the workholder 132 (see Figs. 2 and 3) and are connected at their rear ends to identical toggle links 151 which are pivotally connected to toggle links 152 rotatably supported on a laterally extending pivot pin 153 at the rear end of the workholder 132. The toggle links 152 are connected to turn as a single unit by a strap 154 arranged to be engaged by an actuating lug 155 secured to the upper end of an axially movable control shaft 156 which is preferably connected to be moved downwardly by a treadle control, not here specifically shown.

The work clamping jaws 146 are released prior to the final indexing movement which transfers the work support with the eyeleted and laced upper held thereon back to the loading station by means of an automatic release mechanism which is substantially similar to corresponding mechanism in the Fossa patent.

As best shown in Figs. 2 and 3, upper and lower vamp spreaders 147, 148 are associated with each workholder, the vamp spreaders 147, 148 being each formed and arranged to swing about a common pivot 190 and connected for related movements to engage simultaneously against opposite faces of the vamp portion of the upper. Each of the arms 147, 148 is provided at its outer end with a relatively slender, curved lateral extension 192 which for the engaging position of the vamp spreader passes across the vamp portion of the upper immediately beyond the end of the lacing slit.

An improved auxiliary supporting device is provided for controlling the outwardly disposed toe portion of the shoe upper which with the eyelet flaps in either an inside-up or an outside-up position during the transfer of the upper from the loading station to the eyeleting station and during the feeding movements of the workholder outwardly for the performance of the eyeleting operation. The supporting device referred to comprises an auxiliary table 314 (see Fig. 4) which is located at the side of the eyeleting station toward the loading station, being supporting from the eyeleting machine on a bracket 316, and is separated from the eyeleting mechanism feed slide 142 to permit the downwardly projecting heel and side portions of an upper locaated on the workholder in an outside-up position to be fed outwardly between the eyeleting mechanism and table 314 without interference. Additional support is provided for the outlying toe portions of the upper at the eyeleting station by means of an auxiliary guide 318 in the form of an arcuately bent wire which is mounted on the eyeleting machine feed slide 142 for movement therewith radially outwardly from the turret during the progress of the eyeleting operation. The auxiliary guide 318 is bent to conform substantially to the curvature of the periphery of the turret casing and with the end portion thereof overlying the table 314. During the idexing movement of the turret which carries a workholder and clamped upper from the loading to the eyeleting station, the outlying toe portions of the upper will be engaged by the table 314 and thereafter by the laterally auxiliary guide 318. This support is maintained during the subsequent feeding movement of the workholder outwardly away from the turret by the movement therewith of the guide 318, the end of which continues to ride on the auxiliary table 314.

Referring further to Fig. 4 it will be seen tthat a similar side table 320 is provided at the right hand side of the lacing mechanism of the machine, being supported from a bracket 324 on the turret casing. The side table 320 is spaced from the lacing machine to permit the side and heel portions of the upper to move between the lacing machine and the side table 320 during the outward feeding movement of the work support at the lacing station. A horizontally disposed arcuate wire guide member 326 is rigidly secured to the lacing machine slide 145 adjacent the turret, and projects from the slide sufficiently so that the end thereof overlies the side table 320. It will readily be appreciated that during the indexing movement of a loaded work support to the lacing station, and subsequently during the outward feeding movement of the workholder, loose portions of the upper will be adequately supported by the side table 320 and also by the arcuate guide member 326 which moves outwardly away from the turret along with the lacing feed mechanism.

I claim:

1. In a machine for operating upon shoe uppers having a plurality of operating, loading and unloading stations, a rotatable turret, a workholder supported by the turret to be transferred therewith to different stations and for movement on the turret radially outwardly from a transfer position toward the turret axis comprising upper and lower clamping elements on the workholder for mounting the upper with the lacing margins in an opened-out edge-facing relation and with the heel portion of the upper placed toward the axis of the turret encircling one of said elements, a mechanism for operating upon the upper at one of said stations having operating instrumentalities, and a feed element connectable with the workholder for moving the workholder and upper outwardly from said turret, a side table on which the upper is moved to the operating station and further disposed to provide a space between the side table and station for the ankle and heel portions of the upper on the workholder, and an auxiliary horizontally disposed upper toe support mounted from the feed element for movement therewith on which the toe portions of the upper are guided from the side table to said operating instrumentalities.

2. In a machine for operating upon shoe uppers having a plurality of operating, loading and unloading stations, a rotatable turret, a workholder supported by the turret to be transferred therewith to different stations and for movement on the turret radially outwardly from a transfer position toward the turret axis comprising upper and lower clamping elements on the workholder for mounting the upper with the lacing margins in an opened-out edge-facing relation and with the heel portion of the upper placed toward the axis of the turret encircling one of said elements, and a vamp spreader comprising upper and lower vamp spreader elements formed with transverse vamp spreader arms arranged to engage therebetween the outer portions of the toe and vamp and pivotally supported from the workholder for movement between an opened-out and a closed position, a mechanism for operating upon the upper at each operating station having operating instrumentalities, and a feed element connectable with the workholder for moving the workholder and the upper outwardly from the turret, a side table supported from the machine outwardly of the turret and underlying the closed vamp spreader on which outlying portions of the upper are moved to the operating station and further disposed to provide a space between the side table and station to receive the ankle and heel portions of the upper moving outwardly on the workholder, and an auxiliary upper support secured to said feed element extending arcuately about the turret from the feed element to the side table for guiding the toe portions of the upper from the side table to said operating instrumentalities.

3. In a machine for operating upon shoe uppers having a rotatable turret, a loading station and adjacent thereto an operating station, a workholder supported by the turret to be transferred therewith to successive stations including a transfer movement from the loading station to the operating station and for movement of the turret radially outwardly from a transfer position toward the turret axis comprising upper and lower clamping elements on the workholder for mounting the upper with the lacing margins in an opened-out edge-facing relation and with the heel portion of the upper placed toward the axis of the turret encircling one of said elements, and a vamp spreader comprising upper and lower vamp spreader elements formed with transverse vamp spreader arms arranged to engage therewith the outer portions of the toe and vamp and pivotally mounted from the workholder for movement between an opened-out and a closed position, an operating mechanism at one of said stations having operating instrumentalities, and a feed slide connectable with the workholder transferred to said station and movable with the workholder and upper outwardly from the turret, a side table supported from the machine outwardly from the turret between the loading and operating stations underlying the closed vamp spreader and supported upper, and further disposed to provide a space between a side table and operating station to receive the ankle and heel portions of the upper moving outwardly on the workholder, and an auxiliary wire support secured to the feed slide extending arcuately about the turret from the feed slide to the side table and beneath the path of outlying portions of the closed vamp spreader and upper.

No references cited.